United States Patent [19]
Moradi-Araghi

[11] Patent Number: 5,179,136
[45] Date of Patent: Jan. 12, 1993

[54] GELATIN OF ACRYLAMIDE-CONTAINING POLYMERS WITH AMINOBENZOIC ACID COMPOUNDS AND WATER DISPERSIBLE ALDEHYDES

[75] Inventor: Ahmad Moradi-Araghi, Bartlesville, Okla.

[73] Assignee: Phillips Petroleum Company, Bartlesville, Okla.

[21] Appl. No.: 580,066

[22] Filed: Sep. 10, 1990

[51] Int. Cl.⁵ .................................................. C09K 7/00
[52] U.S. Cl. .................................... 523/130; 524/238; 524/239; 524/240; 525/379
[58] Field of Search .............. 523/130; 524/354, 355, 524/238, 239, 240; 525/379

[56] References Cited

U.S. PATENT DOCUMENTS

| | | | |
|---|---|---|---|
| 4,167,500 | 9/1979 | Jazenski et al. | 260/29.3 |
| 4,299,747 | 11/1981 | Birkmeyer | 260/29.6 |
| 4,440,228 | 4/1984 | Swanson | 166/274 |
| 4,476,033 | 10/1984 | Josephson | 252/8.55 C |
| 4,799,548 | 1/1989 | Mumallah | 166/280 |
| 4,822,842 | 4/1989 | Mumallah et al. | 524/346 |
| 4,934,456 | 6/1990 | Moradi-Araghi | 166/270 |
| 5,043,364 | 8/1991 | Moradi-Araghi | 523/130 |

*Primary Examiner*—Paul R. Michl
*Assistant Examiner*—John T. Guarriello
*Attorney, Agent, or Firm*—Cynthia L. Stokes

[57] ABSTRACT

A novel composition and process are disclosed for forming crosslinked gels at elevated temperatures utilize a novel crosslinking agent comprising at least one aminobenzoic acid compound and a water dispersible aldehyde or aldehyde generating compound.

14 Claims, No Drawings

GELATIN OF ACRYLAMIDE-CONTAINING POLYMERS WITH AMINOBENZOIC ACID COMPOUNDS AND WATER DISPERSIBLE ALDEHYDES

FIELD OF THE INVENTION

The present invention relates to a novel process for crosslinking water-soluble polymers utilizing an organic crosslinking system composed of aminobenzoic acid compounds and a water dispersible aldehyde.

BACKGROUND OF THE INVENTION

It is well known to those skilled in the art that gelled or crosslinked water-soluble polymers are useful in enhanced oil recovery operations. They have been used to alter the permeability of underground formations in order to enhance the effectiveness of water flooding operations. Polymers along with an appropriate crosslinking system are injected in an aqueous solution into the formation. The polymers then permeate into and gel in the regions having the highest water permeability. Any fluids injected into the formation in subsequent water flooding operations, will then be diverted away from the regions in which the gel formed to areas of the formation now having a higher water permeability.

Although this technique is effective in enhancing hydrocarbon production, it does have problems. One of the primary problems being conventional crosslinking agents are very toxic.

It would therefore be a valuable contribution to the art to develop an organic crosslinking systems which have reduced toxicity.

Thus, it is an object of the present invention to provide a novel crosslinking system with reduced toxicity.

It is a further object of the present invention to provide novel gels formed with said novel crosslinking system and water-soluble polymers.

Other aspects and objects of this invention will become apparent here and after as the invention is more fully described in the following summary of the invention and detailed description of the invention, examples, and claims.

SUMMARY OF THE INVENTION

In accordance with the present invention we have discovered that a method of altering the permeability of a porous subterranean formation in fluid communication with a wellbore comprising transmitting into said porous subterranean formation via the fluid communication of said wellbore (a) a water-soluble polymer present in the range of from about 0.1 weight percent to about 5.0 weight percent wherein said water-soluble polymer contains in the range of about 100 mole percent to about 5 mole percent of at least one monomer of the formula:

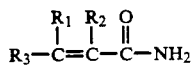

wherein $R_1$, $R_2$, and $R_3$ are selected from the group consisting of hydrogen and alkyl radicals containing from 1 to 3 carbon atoms and from 0 to 95 mole percent of at least one monomer selected from the group consisting of;

(i) a monomer which can be represented by the formula:

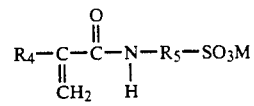

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and arylene radical containing from 6 to 10 carbon atoms, and M is selected from the group consisting of hydrogen, ammonium, potassium, and sodium;

(ii) a monomer represented by the following formula:

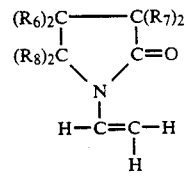

where $R_6$, $R_7$, and $R_8$ are independently selected from the group consisting of hydrogen and alkyl radicals containing from 1 to 2 carbon atoms;

(iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)diethylmethylammonium methyl sulfate; and combinations of two or more thereof;

(b) a water dispersible aldehyde or aldehyde generating compound present in the range of about 0.00.5 to about 5.0 weight percent;

(c) at least one aminobenzoic acid compound present in the range of from about 0.005 to about 5.0 weight percent of the formula:

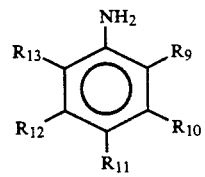

wherein $R_9$, $R_{10}$, $R_{11}$, $R_{12}$ and $R_{13}$, are selected from the group consisting of hydrogen, carboxyl, and amino radicals, and at least one $R_9$, $R_{11}$, and $R_{13}$ radical must be a carboxyl radical and (d) water present in the range of from about 85 to about 99.9 weight percent; and allowing the water-soluble polymer, water dispersible aldehyde or aldehyde generating compound, aminobenzoic acid compound and water to gel in said porous subterranean formation.

In accordance with another embodiment of the present invention we have also discovered a gel composition produced from the gelation of the following components (a) a water-soluble polymer present in the range of from about 0.1 weight percent to about 5.0 weight percent wherein said water-soluble polymer contains in the range of about 100 mole percent to about 5 mole percent of at least one monomer of the formula:

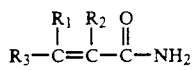

wherein $R_1$, $R_2$, and $R_3$ are selected from the group consisting of hydrogen and alkyl radicals containing from 1 to 3 carbon atoms and from 0 to 95 mole percent of at least one monomer selected from the group consisting of;

(i) a monomer which can be represented by the formula:

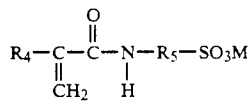

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and an arylene radicals containing from 6 to 10 carbon atoms, and M is selected from the group consisting of hydrogen, ammonium, potassium, and sodium;

(ii) a monomer represented by the formula:

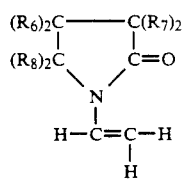

where $R_6$, $R_7$, and $R_8$ are independently selected from the group consisting of hydrogen and alkyl radicals containing from 1 to 2 carbon atoms;

(iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)diethylmethylammonium methyl sulfate; and mixtures of any two or more thereof;

(b) a water dispersible aldehyde present in the range of from about 0.005 to about 5.0 weight percent;

(c) at least one aminobenzoic acid compound present in the range of from about 0.005 to about 5.0 weight percent of the formula:

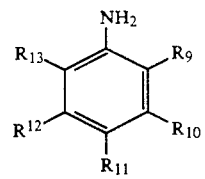

wherein $R_9$, $R_{10}$, $R_{11}$, $R_{12}$ and $R_{13}$, are selected from the group consisting of hydrogen, carboxyl, and amino radicals; and at least one $R_9$, $R_{11}$, and $R_{13}$ radical must be a carboxyl radical; and (d) water present in the range of from about 85 to about 99.9 weight percent.

DETAILED DESCRIPTION OF THE INVENTION

The organic crosslinking system of the present invention is formed from:

(a) at least one aminobenzoic acid compound
(b) a water dispersible aldehyde or aldehyde generating compound.

Aminobenzoic acid compounds suitable for use in the present invention are of the formula:

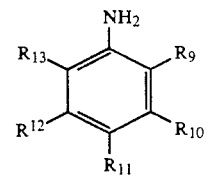

wherein $R_9$, $R_{10}$, $R_{11}$, $R_{12}$ and $R_{13}$, are selected from the group consisting of hydrogen, carboxyl, and amino radicals, and at least one $R_9$, $R_{11}$ and $R_{13}$ radical must be a carboxyl radical.

Suitable aminobenzoic acid compounds include but are not limited to those selected from the group consisting of o-aminobenzoic acid (anthranilic acid), p-aminobenzoic acid, 2,3-diaminobenzoic acid, 3,4-diaminobenzoic acid, 3,5-diaminobenzoic acid, 5-aminoisophthalic acid, 3-aminophthalic acid, and 4-aminophthalic acid. The preferred aminobenzoic acid compounds for the practice of the present invention is o-aminobenzoic acid and p-aminobenzoic acid.

Any water dispersible aldehyde or aldehyde generative compound can be utilized in the practice of the present invention. Thus, suitable aldehyde or aldehyde generating compounds can be selected from the group consisting of aliphatic aldehydes, aliphatic dialdehydes, and aromatic aldehydes, aromatic dialdehyes. Preferred aldehydes or aldehyde generating compounds can be selected from the group consisting of formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde and mixtures thereof.

As a general guide, the amount of aminobenzoic acid compounds used in preparing the gelled compositions of the invention will be in the range of about 0.005 to about 5.0 wt.%, preferably from in the range of about 0.01 to about 2.0 wt.% and most preferably from in the range of about 0.05 to about 1.0 wt% based on the total weight of the gelable composition. The amount of aldehyde or aldehyde generating compound used will be in the range of about 0.005 to about 5.0 wt.%, preferably in the range of about 0.01 to about 2.0 wt.% and most preferably in the range of about 0.05 to about 1.0 wt% based on the total weight of the gelable composition. The molar ratio of aminobenzoic acid compound to aldehyde or aldehyde generating compound will be in the broad range of about 30:1 to 1:30 with a more preferred range of 2:1 to 1:4.

As used in this application, the term water-soluble polymer, copolymers, and terpolymers refers to those polymers which are truly water-soluble or those which are dispersible in water or other aqueous medium to form a stable colloidal suspension which can be pumped into a formation and gelled therein.

The water-soluble polymers which are suitable for use in the present invention include those which contain from 5 to 100 mole percent of at least one monomer of the formula:

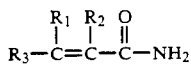

wherein $R_1$, $R_2$, and $R_3$ are selected from the group consisting of hydrogen and alkyl radicals containing from 1 to 3 carbon atoms, of which acrylamide and methacrylamide are the preferred examples; and from 0 to 95 mole percent of at least one monomer selected from the group consisting of;

(a) monomers represented by the formula:

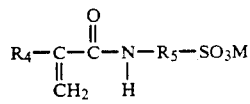

wherein $R_4$ is selected from the group consisting of hydrogen or alkyl radicals containing from 1 to 6 carbon atoms, $R_5$ is selected from the group consisting of alkylene radicals containing from 1 to 6 carbon atoms and arylene radicals containing from 6 to 10 carbon atoms, and M is selected from the group consisting of hydrogen, ammonium, potassium, and sodium, of which 2-acrylamido-2-methylpropane sulfonic acid or sodium 2-acrylamido-2-methylpropane sulfonate are the preferred examples;

(b) monomers represented by the formula:

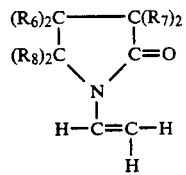

where $R_6$, $R_7$ and $R_8$ are independently selected from the group consisting of hydrogen and alkyl radicals containing from 1 to 2 carbon atoms of which N-vinyl-2-pyrrolidone is the preferred example;

(c) at least one monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)diethylmethylammonium methyl sulfate; and (d) mixtures of any two or more thereof.

The polymerization of any of the above described monomers and the resulting polymers are well known to those skilled in the art. There are numerous references which disclose the methods of polymerizing these monomers, for example see U.S. Pat. No. 4,244,826. The manner in which these monomers are polymerized into water-soluble polymers or the resulting polymers is not critical to the practice to the present invention. The molecular weight of the water-soluble polymers utilized in the present invention is not critical. It is presently preferred, however, that polymers have the molecular weight of at least 100,000 and more preferably about 100,000 to about 20,000,000. The upper limit is not critical as long as the polymer is still water dispersible and can be pumped into the formation.

The presently preferred class of water-soluble polymers are those selected from the group consisting of homopolymers of acrylamide, homopolymers of methacrylamide, copolymers of acrylamide and acrylic acid, copolymers of acrylamide and sodium acrylate, copolymers of acylamide and N-vinyl-2-pyrrolidone, copolymers of acrylamide and sodium 2-acrylamido-2-methylpropane sulfonate, copolymers of acrylamide and 2-acrylamido-2-methylpropane sulfonic acid, terpolymers of acrylamide, N-vinyl-2-pyrrolidone, and sodium 2-acrylamido-2-methylpropane sulfonate and terpolymers of acrylamide, N-vinyl-2-pyrrolidone and 2-acrylamido-2-methylpropane sulfonic acid. The ratio of the monomers in the above-described polymers is not critical; provided however, that at least 5 mole percent of acrylamide is present in the above-described polymers. Particularly preferred are terpolymers of N-vinyl-2-pyrrolidone, acrylamide and sodium 2-acrylamido-2-methylpropane sulfonate wherein said monomers are provided in a 30 to 15 to 55 weight percent terpolymer. However, other polymers with more sub units may also be utilized in the practice of this invention. Additionally within the scope of this invention is the use of combinations of homopolymers, copolymers and terpolymers utilizing the above listed monomers.

The constituents of the present invention should be present in the following quantities:

TABLE I

| | Broad Range weight percent | Preferred Range weight percent |
|---|---|---|
| water-soluble polymers | 0.1–5.0 | 0.3–2.0 |
| aldehyde or aldehyde generating compound | 0.005–5.0 | 0.01–2.0 |
| aminobenzoic acid compound | 0.005–5.0 | 0.01–2.0 |
| water | 85–99.89 | 94–99.68 |

The order in which the constituents are mixed is not critical to the practice of the present invention. However, it is preferred that the polymer be dissolved in water first.

The use of gelled polymers to alter the water permeability of underground formations is well known to those skilled in the art. Generally, an aqueous solution containing the polymer and a crosslinking agent is transmitted into the formation from a well in fluid communication with the formation so that the aqueous solution can diffuse into the more water permeable portions of the formation and alter that water permeability by gelling therein.

The present invention can be used in a similar manner. An aqueous solution containing the water-soluble polymer, aldehyde or aldehyde generating compound, and aminobenzoic acid compounds are pumped into the formation so that it alters the water permeability of the formation in a similar manner when gelation takes place. The aqueous solution containing the water soluble polymer, aldehyde or aldehyde generating compound and aminobenzoic acid compound can be pumped into the formation in one slug, or alternatively the components may be sequentially injected in a manner to provide an appropriate concentration in the formation.

The nature of the underground formation treated is not critical to the practice of the present invention. The organic crosslinkers will gel the water-soluble polymers in fresh water, salt water, or brines, as well as at a temperature range of from 200° F. to 300° F., and preferrably in formations with a temperature of about 200° F. to about 250° F.

The following specific examples are intended to illustrate the advantages of this invention, but are not intended to unduly limit this invention.

EXAMPLE I

The purpose of this example is to demonstrate the gelation of a water-soluble polymer by an aminobenzoic acid compound and an aldehyde. Additionally this example demonstrates the long term stability of a gel formed with a water-soluble polymer, aminobenzoic acid compounds and an aldehyde.

A 0.7 percent solution of a terpolymer composed of 30 wt % of N-vinyl-2-pyrrolidone, 15 wt % of acrylamide, and 55 wt % of sodium 2-acrylamido-2-methylpropane sulfonate was prepared in the following manner. 16.3 ml of an inverse emulsion which contained 32.4 wt % of the above-described active terpolymer was mixed with 500 ml of synthetic sea water.

The synthetic water used had the following formula:

| | | |
|---|---|---|
| $NaHCO_3$ | 3.69 | grams |
| $Na_2SO_4$ | 77.19 | grams |
| NaCl | 429.00 | grams |
| $CaCl_2.2H_2O$ | 29.58 | grams |
| $MgCl_2.6H_2O$ | 193.92 | grams |
| distilled $H_2O$ | q.s. to 18 | liters |

0.205 g of p-aminobenzoic acid and 0.511 ml of 37% formaldehyde was added to 100 ml of the polymer and synthetic sea water mixture described above, to provide a concentration of 2000 ppm each of p-aminobenzoic acid and formaldehyde. Similarly 0.358 g of p-aminobenzoic acid and 0.894 ml of formaldehyde was added to 100 ml of the polymer and synthetic sea water mixture to generate a concentration of 3500 ppm p-aminobenzoic acid and formaldehyde.

Then 20 ml samples of each solution were placed in three 20 ml ampules.

The six ampules were sealed under nitrogen and then placed upright in compartmented aluminum boxes with relief holes and placed in an oven and heated to 200° F., 250° F., or 300° F. Periodically, the ampules were removed from the oven and the mechanical strength of the gel was determined behind a protective shield.

The mechanical strength of the gel can be calculated by placing the ampules horizontally along a graduated scale and measuring the spread of the gel. If the gel is weak it will spread. The mechanical strength is then expressed mathematically as $$\text{Percent Gel Strength} = (AL - TL) \times 100/AL$$

where AL equals ampule length (in centimeters), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0.

TABLE II

Gelation of 0.7% Terpolymer Solution in Synthetic Seawater with
p-Aminobenzoic Acid and Formaldehyde at 200° F., 250° F. and 300° F.
Tongue Length or Gel Length (GL) in Centimeters

| | Temperature | | | | | |
|---|---|---|---|---|---|---|
| | 200° F. | | 250° F. | | 300° F. | |
| Aging Time | X-Linker Concentration[a] (ppm) | | | | | |
| (days) | 2,000 | 3,500 | 2,000 | 3,500 | 2,000 | 3,500 |
| 0.3 | 9.3 | 2.5 | PG | 4.3 | SG | 14.0 |
| 0.6 | 13.0 | 2.8 | PG | 3.4 | PG | 12.8 |
| 1.1 | 13.8 | 3.5 | PG | 5.5 | PG | 12.0 |
| 2.1 | 13.6 | 3.2 | PG | 2.7 | PG | 14.5 |
| 3.0 | 12.8 | 3.0 | PG | 2.4 | PG | 14.5 |
| 7.0 | 7.3 | 2.6 | PG | 1.9 | 17.8 | 8.0 |
| 8.8 | 12.8 | 1.5 | PG | 2.4 | 20.8 | 11.6 |
| 12.9 | 12.2 | 3.0 | 19.5 | 2.4 | 19.5 | 11.0 |
| 27.0 | 7.6 | 2.1 | 14.0 | 11.5 | 20.0 | 12.0 |
| 34.0 | 14.0 | 6.2[b] | 13.0 | 15.0 | PG | 10.8 |
| 64.0 | 5.0 | 11.0 | 8.7 | 8.2 | PG | 2.8 |
| 111.0 | PG | 3.4 | 13.3 | 9.5 GL + 0.6 L | 1.8 + 5.2 L | Gel + Liquid |
| 161.0 | PG | 4.0 | 7.9 | 17.0 GL + 1.2 L | NG | Terminated |
| 204.0 | 17.3 | 5.1 | 13.3 | 16.0 GL + 1.6 L | Terminated | — |
| 244.0 | 20.3 | 4.0 | 13.3 | 16.0 GL + 1.7 L | — | — |
| 282.0 | 11.4 | 5.1 | 13.3 | 15.0 GL + 1.7 L | — | — |
| 350.0 | 18.2 | 4.4 | 13.0 | 13.6 GL + 1.8 L | — | — |
| 464.0 | 20.0 | 4.0 GL + 0.2 L | 6.8 | 13.5 GL + 2.0 L | — | — |
| 533.0 | 19.8 | 2.6 GL + 0.4 L | 7.0 | 10.2 GL + 2.0 L | — | — |

TABLE II-continued

Gelation of 0.7% Terpolymer Solution in Synthetic Seawater with
p-Aminobenzoic Acid and Formaldehyde at 200° F., 250° F. and 300° F.
Tongue Length or Gel Length (GL) in Centimeters

| Aging Time (days) | Temperature | | | | | |
|---|---|---|---|---|---|---|
| | 200° F. | | 250° F. | | 300° F. | |
| | X-Linker Concentration[a] (ppm) | | | | | |
| | 2,000 | 3,500 | 2,000 | 3,500 | 2,000 | 3,500 |
| 604.0 | 20.1 | 5.0 GL + 0.5 L | 11.4 + 0.2 L | 9.5 GL + 2.0 L | — | — |
| 763.0 | 16.0 | 9.7 GL + 0.7 L | 11.7 + 0.3 L | 6.5 GL + 2.2 L | — | — |
| 883.0 | 15.6 + 0.2 L | 16.6 GL + 0.9 L | 7.0 + 0.2 L | 8.9 GL + 2.3 L | — | — |

[a]The numbers given represent the concentration of each crosslinker.
[b]Measured after shaking the gel.
PG = Partial Gel, GL = Gel Length in centimeters.
L = The height of a liquid separated from gel in centimeters.

The results above demonstrate that the combination of a aminobenzoic acid compound and an aldehyde to crosslink a water-soluble polymer provide long term stability, especially at temperatures around 200° F.

EXAMPLE II

The purpose of this example is to demonstrate the gelation of a water-soluble polymer by an aminobenzoic acid compound and an aldehyde. Additionally this example demonstrates the long term stability of a gel formed with a water-soluble polymer, aminobenzoic acid compounds and an aldehyde.

A 0.7 percent solution of a terpolymer composed of 30 wt % of N-vinyl-2-pyrrolidone, 15 wt % of acrylamide, and 55 wt % of sodium 2-acrylamido-2-methylpropane sulfonate was prepared in the following manner. 16.3 ml of an inverse emulsion which contained 32.4 wt % of the above-described active terpolymer was mixed with 500 ml of synthetic sea water.

The synthetic water used had the following formula:

| | |
|---|---|
| NaHCO$_3$ | 3.69 grams |
| Na$_2$SO$_4$ | 77.19 grams |
| NaCl | 429.00 grams |
| CaCl$_2$.2H$_2$O | 29.58 grams |
| MgCl$_2$.6H$_2$O | 193.92 grams |
| distilled H$_2$O | q.s. to 18 liters |

0.205 g of o-aminobenzoic acid and 0.511 ml of 37% formaldehyde was added to 100 ml of the polymer and synthetic sea water mixture described above, to provide a concentration of 2000 ppm each of o-aminobenzoic acid and formaldehyde. Similarly 0.358 g of o-aminobenzoic acid and 0.894 ml of formaldehyde was added to 100 ml of the polymer and synthetic sea water mixture to generate a concentration of 3500 ppm o-aminobenzoic acid and formaldehyde.

Then 20 ml samples of each solution were placed in three 20 ml ampules.

The six ampules were sealed under nitrogen and then placed upright in compartmented aluminum boxes with relief holes and placed in an oven and heated to 200° F., 250° F., or 300° F. Periodically, the ampules were removed from the oven and the mechanical strength of the gel was determined behind a protective shield.

TABLE II

Gelation of 0.7% Terpolymer Solution in Synthetic Seawater with
o-Aminobenzoic Acid and Formaldehyde at 200° F., 250° F. and 300° F.
Tongue Length or Gel Length (GL) in Centimeters

| Aging Time (days) | Temperature | | | | | |
|---|---|---|---|---|---|---|
| | 200° F. | | 250° F. | | 300° F. | |
| | X-Linker Concentration[a] (ppm) | | | | | |
| | 2,000 | 3,500 | 2,000 | 3,500 | 2,000 | 3,500 |
| 0.2 | SG | S-PG | VT | VT | VT | VT |
| 0.9 | VSG | 21.0 | VSG | VSG | VSG | SG |
| 1.0 | VSG | 18.5 | VSG | SG | VSG | SG |
| 1.2 | VSG | 18.0 | VSG | SG | VSG | SG |
| 1.9 | VSG | 16.0 | SG | SG | SG | S-PG |
| 2.9 | VSG | 15.0 | SG | SG | SG | S-PG |
| 3.9 | SG | 14.5 | SG | S-PG | S-PG | S-PG |
| 6.9 | SG | 13.4 | SG | S-PG | S-PG | S-PG |
| 8.1 | S-PG | 13.2 | SG | S-PG | PG | 18.5 |
| 8.9 | S-PG | 13.0 | SG | S-PG | PG | 18.5 |
| 10.2 | S-PG | 13.5 | SG | SG | PG | 16.8 |
| 13.9 | S-PG | 14.0 | SG | SG | S-PG | 14.3 |
| 21.0 | S-PG | 15.0 | S-PG | S-PG | PG | 12.5 |
| 28.9 | S-PG | 15.0 | PG | PG | PG | 7.8 |
| 98.0 | — | — | 14.8 | 6.5 | PG | 11.2 |
| 127.0 | S-PB[b] | 7.5 | 13.8 | 5.7 | S-PG | PG |
| 162.0 | — | 8.4 | 9.7 | 4.6 | NG | S-PG |
| 195.0 | — | 7.2 | 9.1 | 3.7 | NG | VSG |
| 238.0 | — | 7.8 | 8.7 | 4.0 | Terminated | Terminated |
| 249.4 | — | 7.6 | 13.9 | 3.5 | — | — |
| 423.0 | — | 7.0 | 8.8 | 3.3 | — | — |
| 510.0 | — | 7.1 | 11.8 | 3.0 | — | — |
| 563.0 | — | 6.3 | 14.7 | 3.4 | — | — |

TABLE II-continued

Gelation of 0.7% Terpolymer Solution in Synthetic Seawater with o-Aminobenzoic Acid and Formaldehyde at 200° F., 250° F. and 300° F. Tongue Length or Gel Length (GL) in Centimeters

| Aging Time (days) | Temperature | | | | | |
|---|---|---|---|---|---|---|
| | 200° F. | | 250° F. | | 300° F. | |
| | X-Linker Concentration[a] (ppm) | | | | | |
| | 2,000 | 3,500 | 2,000 | 3,500 | 2,000 | 3,500 |
| 841.0 | — | 6.7 | 15.6 | 3.0 | — | — |

[a]The numbers given represent the concentration of each crosslinker.
[b]Test discontinued (broken ampule accidentally).
NG = No Gel, PG = Partial Gel, SG = Slight Gel, VSG = Very Slight Gel.

The results above demonstrate that the combination of a aminobenzoic acid compound and an aldehyde to crosslink a water-soluble polymer provide long term stability, especially at temperatures around 200° F.

Reasonable variations can be made in view of the following disclosure without departing from the spirit and scope of this invention.

That which is claimed is:

1. A method of altering the permeability of a porous subterranean formation in fluid communication with a wellbore comprising transmitting into said porous subterranean formation via the fluid communication of said wellbore to said porous subterranean formation, (a) a water-soluble polymer present in the range of from about 0.1 weight percent to about 5.0 weight percent wherein said water-soluble polymer contains in the range of about 100 mole percent to about 5 mole percent of at least one monomer of the formula:

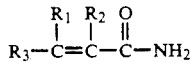

wherein $R_1$, $R_2$, and $R_3$ are selected from the group consisting of hydrogen and alkyl radicals containing from 1 to 3 carbon atoms, and from 0 to 95 mole percent of at least one monomer selected from the group consisting of;

(i) a monomer which can be represented by the following formula:

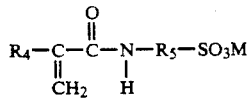

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and an arylene radicals containing from 6 to 10 carbon atoms, and M is selected from the group consisting of hydrogen, ammonium, potassium, and sodium;

(ii) a monomer represented by the following formula:

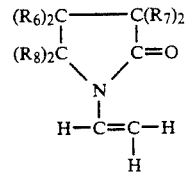

where $R_6$, $R_7$ and $R_8$ are independently selected from the group consisting of hydrogen and alkyl radicals containing from 1 to 2 carbon atoms;

(iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)-diethylmethylammonium methyl sulfate; and mixtures of any two or more thereof;

(b) a water dispersible aldehyde or aldehyde generating compound present in the range of about 0.005 to about 5.0 weight percent (c) at least one aminobenzoic acid compound present in the range of from about 0.005 to about 5.0 weight percent of the formula:

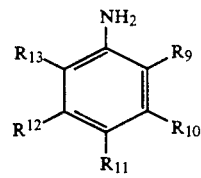

wherein $R_9$, $R_{10}$, $R_{11}$, $R_{12}$ and $R_{13}$, are selected from the group consisting of hydrogen, carboxyl, amino radicals; and at least one $R_9$, $R_{11}$, and $R_{13}$, radical must be a carboxyl radical; and (d) water present in the range of from about 85 to about 99.89 weight percent; and allowing the water-soluble polymer, water dispersible aldehyde or aldehyde generating compound, aminobenzoic acid compounds and water to form a gel in said porous subterranean formation.

2. The method of claim 1 wherein said water-soluble polymer is selected from the group consisting of homopolymers of acrylamide, homopolymers of methacrylamide, copolymers of acrylamide and acrylic acid, copolymers of acrylamide and sodium acrylate, copolymers of acrylamide and N-vinyl-2-pyrrolidone, copolymers of acrylamide and sodium 2-acrylamido-2-methylpropane sulfonate, copolymers of acrylamide and 2-acrylamido-2-methylpropane sulfonic acid, terpolymers of N-vinyl-2-pyrrolidone, acrylamide, and sodium 2-acrylamido-2-methylpropane sulfonate and terpolymers of acrylamide, N-vinyl-2-pyrrolidone and 2-acrylamido-2-methylpropane sulfonic acid;

said at least one aminobenzoic acid compound is selected from the group consisting of o-aminobenzoic acid (anthranilic acid), p-aminobenzoic acid, 3,4-diaminobenzoic acid, 2,3-diaminobenzoic acid, 3,5-diaminobenzoic acid, 5-aminoisophthalic acid, 3-aminophthalic acid, 4-aminophthalic acid and combinations of two or more thereof;

said aldehyde or aldehyde generating compound is selected from the group consisting of formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, and combinations of two or more thereof.

3. The method of claim 1 wherein said water-soluble polymer is present in the range of from 0.3–2 weight percent;

said at least one aminobenzoic acid compound is present in the range of from about 0.01 to about 2.0 weight percent;

said water dispersible aldehyde or aldehyde generating compound is present in the range of from about 0.01 to about 2.0 weight percent;

said water is present in the range of from 94.0–99.68 weight percent.

4. The method of claim 1 wherein said water-soluble polymer is a terpolymer of N-vinyl-2-pyrrolidone, acrylamide, and sodium 2-acrylamido-2-methylpropane sulfonate;

said at least one aminobenzoic acid compound is o-aminobenzoic acid; and said aldehyde or aldehyde generating compound is formaldehyde.

5. The method of claim 1 wherein said water-soluble polymer is a terpolymer of N-vinyl-2-pyrrolidone, acrylamide, and sodium 2-acrylamido-2-methylpropane sulfonate;

said at least one aminobenzoic acid compound is p-aminobenzoic acid; and said aldehyde or aldehyde generating compound is formaldehyde.

6. The method of claim 3 wherein said water-soluble polymer is a terpolymer of N-vinyl-2-pyrrolidone, acrylamide, and sodium 2-acrylamido-2-methylpropane sulfonate;

said at least one aminobenzoic acid compound is p-aminobenzoic acid; and said aldehyde or aldehyde generating compound is formaldehyde.

7. The method of claim 3 wherein said water-soluble polymer is a terpolymer of N-vinyl-2-pyrrolidone, acrylamide, and sodium 2-acrylamido-2-methylpropane sulfonate;

said at least one aminobenzoic acid compound is o-aminobenzoic acid; and said aldehyde or aldehyde generating compound is formaldehyde.

8. A gel composition produced from the gelation of the following components:

(a) a water-soluble polymer present in the range of from about 0.1 weight percent to about 5.0 weight percent wherein said water-soluble polymer contains in the range of about 100 mole percent to about 5 mole percent of at least one monomer of the formula:

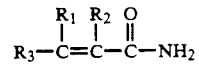

wherein $R_1$, $R_2$, and $R_3$ are selected from the group consisting of hydrogen or alkyl radicals containing from 1 to 3 carbon atoms, and from 0 to 95 mole percent of at least one monomer selected from the group consisting of;

(i) those monomers which can be represented by the following formula:

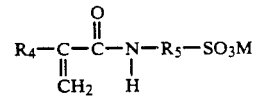

wherein $R_4$ is selected from the group consisting of hydrogen or alkyl radicals containing from 1 to 6 carbon atoms, $R_5$ is selected from the group consisting of alkylene radicals containing from 1 to 6 carbon atoms or an arylene radicals containing from 6 to 10 carbon atoms, and M is selected from the group consisting of hydrogen, ammonium, potassium, or sodium, or (ii) a monomer represented by the following formula:

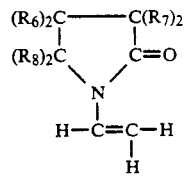

wherein $R_6$, $R_7$, and $R_8$ are independently selected from the group consisting of hydrogen or alkyl radicals containing from 1 to 2 carbon atoms, or (iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)-diethylmethylammonium methyl sulfate; and combinations of any two or more thereof;

(b) a water dispersible aldehyde present in the range of about 0.005 to about 5.0 weight percent;

(c) at least one aminobenzoic acid compounds present in the range of from about 0.005 to about 5.0 weight percent of the formula:

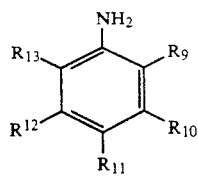

wherein $R_9$, $R_{10}$, $R_{11}$, $R_{12}$ and $R_{13}$, are hydrogen, carboxyl, and amino radicals; and at least one $R_9$, $R_{11}$, and $R_{13}$, radical must be carboxyl radical; and (d) water present in the range of from about 85 to about 99.89 weight percent.

9. The composition of claim 8 wherein said water-soluble polymer is selected from the group consisting of homopolymers of acrylamide, homopolymers of methacrylamide, copolymers of acrylamide and acrylic acid, copolymers of acrylamide and sodium acrylate, copolymers of acrylamide and N-vinyl-2-pyrrolidone, copolymers of acrylamide and sodium 2-acrylamido-2-methylpropane sulfonate, copolymers of acrylamide and acrylamido-2-methylpropane sulfonic acid, terpolymers of N-vinyl-2-pyrrolidone, acrylamide, and sodium 2-acrylamido-2-methylpropane sulfonate and terpolymers of N-vinyl-2-pyrrolidone, acrylamide and 2-acrylamido-2-methyl-propane sulfonic acid;

said at least one aminobenzoic acid compound is selected from the group consisting of o-aminobenzoic acid, p-aminobenzoic acid, 3,4-diaminobenzoic acid, 3,5-diaminobenzoic acid, 5-aminoisophthalic acid, 3-aminophthalic acid, 4-aminophthalic acid and combination of two or more thereof; and said aldehyde or aldehyde generating compound is selected from the group consisting of formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde and combination of two or more thereof.

10. The composition of claim 8 wherein said water-soluble polymer is present in the range of from 0.3-2.0 weight percent;

said at least one aminobenzoic acid compound is present in the range of from about 0.01 to about 2.0 weight percent;

said water dispersible aldehyde is present in the range of from about 0.01 to about 2.0 weight percent;

said water is present in the quantity of from 94.0-99.68 weight percent.

11. The composition of claim 8 wherein said water-soluble polymer is a terpolymer of N-vinyl-2-pyrrolidone, acrylamide, and sodium 2-acrylamido-2-methylpropane sulfonate;

said at least one aminobenzoic acid compound is p-aminobenzoic acid; and said aldehyde is formaldehyde.

12. The composition of claim 8 wherein said water-soluble polymer is a terpolymer of N-vinyl-2-pyrrolidone, acrylamide, and sodium 2-acrylamido-2-methylpropane sulfonate;

said at least one aminobenzoic acid compound is o-aminobenzoic acid; and said aldehyde is formaldehyde.

13. The composition of claim 10 wherein said water-soluble polymer is a terpolymer of N-vinyl-2-pyrrolidone, acrylamide, and sodium 2-acrylamido-2-methylpropane sulfonate;

said at least one aminobenzoic acid compound is p-aminobenzoic acid; and said aldehyde is formaldehyde.

14. The composition of claim 10 wherein said water-soluble polymer is a terpolymer of N-vinyl-2-pyrrolidone, acrylamide, and sodium 2-acrylamido-2-methylpropane sulfonate;

said at least one aminobenzoic acid compound is o-aminobenzoic acid; and said aldehyde is formaldehyde.

* * * * *